(12) United States Patent
Galloway

(10) Patent No.: US 6,557,064 B1
(45) Date of Patent: Apr. 29, 2003

(54) SET UP TIME ADJUST

(75) Inventor: William C. Galloway, Houston, TX (US)

(73) Assignee: Hewlett-Packard Development Company, Palo Alto, CA (US)

( * ) Notice: Subject to any disclaimer, the term of this patent is extended or adjusted under 35 U.S.C. 154(b) by 0 days.

(21) Appl. No.: 09/507,071

(22) Filed: Feb. 18, 2000

Related U.S. Application Data

(60) Provisional application No. 60/120,980, filed on Feb. 19, 1999.

(51) Int. Cl.⁷ .............................................. G06F 13/24
(52) U.S. Cl. ...................................................... 710/260
(58) Field of Search .................................. 710/107, 312, 710/260

(56) References Cited

U.S. PATENT DOCUMENTS

| | | | |
|---|---|---|---|
| 5,463,743 A | 10/1995 | Galloway ..................... 395/285 |
| 5,522,054 A | 5/1996 | Gunlock et al. ............ 395/439 |
| 5,613,074 A | 3/1997 | Galloway ..................... 395/280 |
| 5,675,723 A | 10/1997 | Ekrot et al. ............. 395/182.02 |
| 5,692,200 A | 11/1997 | Carlson et al. .............. 395/735 |
| 5,751,977 A | 5/1998 | Alexander ................... 395/306 |
| 6,078,979 A | * 6/2000 | Li et al. ...................... 710/312 |
| 6,317,417 B1 | * 11/2001 | Childs et al. ................ 710/107 |

* cited by examiner

*Primary Examiner*—Glenn A. Auve
*Assistant Examiner*—David Glass
(74) *Attorney, Agent, or Firm*—Akin Gump Strauss Hauer & Feld LLP

(57) ABSTRACT

The present invention relates generally to a method for improving the throughput of data transfers on a bus. More specifically, data setup and hold times relative to REQ# and ACK# signal edges are adjusted programmatically to provide greater integrity in the transmission of data.

21 Claims, 8 Drawing Sheets

| Address | Size (bits) | Default |
|---|---|---|
| 900000008 | 16 | 6666 |

FIG. 6

| Selection | Delta Data Setups | Delay In ns |
|---|---|---|
| 0000 | -3.0 | -12.5 |
| 0001 | -2.5 | -10.4 |
| 0010 | -2.0 | -8.3 |
| 0011 | -1.5 | -6.3 |
| 0100 | -1.0 | -4.2 |
| 0101 | -0.5 | -2.1 |
| 0110 | 0.0 (default) | 0 |
| 0111 | +0.5 | +2.1 |
| 1000 | +1.0 | +4.2 |
| 1001 | +1.5 | +6.3 |
| 1010 | +2.0 | +8.3 |
| 1011 | +2.5 | +10.4 |
| 1100 | +3.0 | +12.5 |
| 1101 | +3.5 | +14.5 |
| 1110 | +4.0 | +16.6 |
| 1111 | +4.5 | +18.7 |

FIG. 8

| Bit(s) | Name | Type | Default | Description |
|---|---|---|---|---|
| 15:12 | B_REQ Setup | R/W | 6(0110) | Adjust data setup and hold times relative to B_REQ edges. |
| 11:8 | B_ACK Setup | R/W | 6(0110) | Adjust data setup and hold times relative to B_ACK edges. |
| 4:7 | A_REQ Setup | R/W | 6(0110) | Adjust data setup and hold times relative to A_REQ edges. |
| 0:3 | A_ACK Setup | R/W | 6(0110) | Adjust data setup and hold times relative to A_ACK edges. |

FIG. 7

SET UP TIME ADJUST

SPECIFICATION

This application claims the benefit of U.S. Provisional Application No. 60/120,980, filed Feb. 19, 1999, which is incorporated herein by reference.

BACKGROUND OF THE INVENTION

1. Field of the Invention

The present invention relates generally to a method of improving communication on a computer bus, and more particularly, to a method of adjusting the timing of REQ# and ACK# signals to account for a specific configuration of devices on the bus.

2. Description of the Related Art

As long as there have been computers, users have attached peripheral hardware devices to them. Some of the typical hardware interfaces include Integrated Drive Electronics (IDE) and Enhanced IDE (EIDE) buses. One of the more popular and enduring interfaces is the small computer system interface (SCSI) bus. While an IDE bus is restricted to two disk drives and an EIDE bus is restricted to four devices, including hard disks and CD-ROM drives, the SCSI bus is able to support up to fifteen devices such as disk drives, CD-ROM drives, optical drives, printers, and communication devices. One of the attractions of the SCSI bus is its ability to easily adapt to new types of devices by using a standard set of commands, or the SCSI-3 command set.

The SCSI protocol specifies that communication between an initiator, or device that issues SCSI commands, and a target, a device that executes SCSI commands, takes place in phases: BUS_FREE, ARBITRATION, SELECTION, RE-SELECTION, COMMAND, DATA, MESSAGE_IN, MESSAGE_OUT and STATUS. The first four phases, BUS_FREE, ARBITRATION, SELECTION, and RE-SELECTION, are known collectively as the ADDRESS phases and are used to setup a connection between an initiator and a target device.

The BUS_FREE phase is the initial state and, during the BUS_FREE phase, any SCSI device on a particular SCSI bus can attempt to take control of the bus. Often two or more devices request control at the same time (or within the period of a "bus settle delay"—typically 400 ns). Which device gains control is determined in the ARBITRATION phase. After the ARBITRATION phase, the SELECTION phase is performed where the initiator selected in the ARBITRATION phase signals a specific target device that a service is requested. The RE-SELECTION phase is required when an interrupted connection needs to be reestablished.

The final phases, COMMAND, DATA, MESSAGE_IN, MESSAGE_OUT and STATUS, are known collectively as the DATA phases. During the DATA phases, the target device receives commands from the initiator, the two exchange data, and, if necessary, messages and status information are communicated.

If a data transfer is asynchronous, the initiator and the target participate in a handshaking scheme to insure the reliability of the communication. Typically, every data element sent is accompanied by a clock. The target uses the REQ# signal to initiate transfers; the initiator uses an ACK# signal to complete transfers. In the case DATA_IN, or a target sending data to a initiator, the target asserts the REQ# signal to indicate that a byte or word is available and the initiator asserts the ACK# signal to indicate that the byte or word has been received. In the case of DATA_OUT, or a target receiving data from the initiator, the target asserts REQ#, to which the initiator responds by placing data on the bus and asserting ACK#. The target then de-asserts REQ# to acknowledge receipt and the initiator asserts ACK# in response. The handshaking requirements of the SCSI protocol add a large overhead to asynchronous data transfers.

A synchronous data transfer, on the other hand, does not require this element-by-element protocol. During synchronous data transfer, a target does not wait for an individual acknowledgement of each transfer, but rather, employs an "offset value" and transmits that number of REQ#s before requiring an ACK#. The offset is a limit on the number of unacknowledged REQ#s that are allowed before the target must pause and wait for an acknowledgement from the initiator. The data in asynchronous transactions is clocked by the sender's REQ# or ACK# line.

To maximize performance, a SCSI bus should not exceed a predetermined length. For example, the predetermined length can be exceeded when a server, located in one box or unit, is connected through a SCSI bus to a mass storage subsystem, such as a disk drive array or a CD-ROM drive located in another box or unit. To prevent performance degradation, designers have implemented what are known as repeater circuits. Repeater circuits are used to couple short, terminated SCSI bus segments. The repeater circuit includes two ports with each port connected to a different terminated SCSI bus segment. The repeater circuit provides a buffer between the terminated bus segments in order to achieve a high performance SCSI bus that exceeds the predetermined length. To a SCSI controller, the terminated bus segments appear as a single SCSI bus.

SUMMARY OF THE INVENTION

The present invention relates generally to a method for improving the throughput of data transfers on a bus, particularly a SCSI bus. More specifically, data setup and hold times relative to REQ# and ACK# signal edges are adjusted to allow greater accuracy in the transmission of data. Depending upon the number of peripheral devices and SCSI repeaters installed on a computing system, load on the SCSI bus varies. In particular, a SCSI repeater which contains multiple REQ/ACK lines but only one data bus can develop a skew between a clock and the data bus. The setup and hold times are adjusted to compensate for the skew. Currently the SCSI protocol allows only for the reconfiguration of the offset value and the total transmission time per transaction. According to the current invention, a SCSI device, particularly a SCSI repeater, allows additional setup times to be adjusted, specifically the setup and hold times relative to the REQ# and ACK# signal edges. If a SCSI bus contains multiple segments connected by means of repeaters, the setup and hold times can be adjusted to compensate for the different load on the REQ and ACK signal lines than the load on the data bus. In one embodiment, the skew of the REQ# and ACK# signals is adjusted relative to the associated data element.

The configuration of the setup and hold times might need to be reconfigured either when the requirements of the computing system are first determined or when the requirements later change, perhaps due to the addition or removal of a peripheral device or repeater. Another factor that affects the timing characteristics necessary for clean data transmission is the distance peripheral devices are located from the computer and each other. The present invention can extend the permissible length of SCSI cables by enabling the use of multiple repeaters, allowing external SCSI devices such as an optical scanner and a CD-ROM drive to be placed in more convenient locations.

BRIEF DESCRIPTION OF THE DRAWINGS

A better understanding of the present invention can be obtained when the following detailed description of the preferred embodiment is considered in conjunction with the following drawings, in which:

FIG. 6 is a table showing possible values within a control register in a SCSI repeater for memory mapping, memory location size and default values that may be utilized by the method of the present invention;

FIG. 7 is a table showing a detailed example of values for bits in a control register within a SCSI repeater;

FIG. 8 is a table showing possible values used within the control register to encode the method of the present invention.

DETAILED DESCRIPTION OF INVENTION

This application is related to the following co-pending, concurrently filed, and commonly assigned United States patent applications which are hereby incorporated by reference:

U.S. patent application, entitled "SCSI Repeater Circuit With SCSI Address Translation And Enable;"

U.S. patent application, entitled "Communication Mode Between SCSI Devices;"

U.S. patent application, entitled "SCSI Data Rate Speed Determination;" and

U.S. patent application, entitled "SCSI Clock Stretching."

Figure 1:
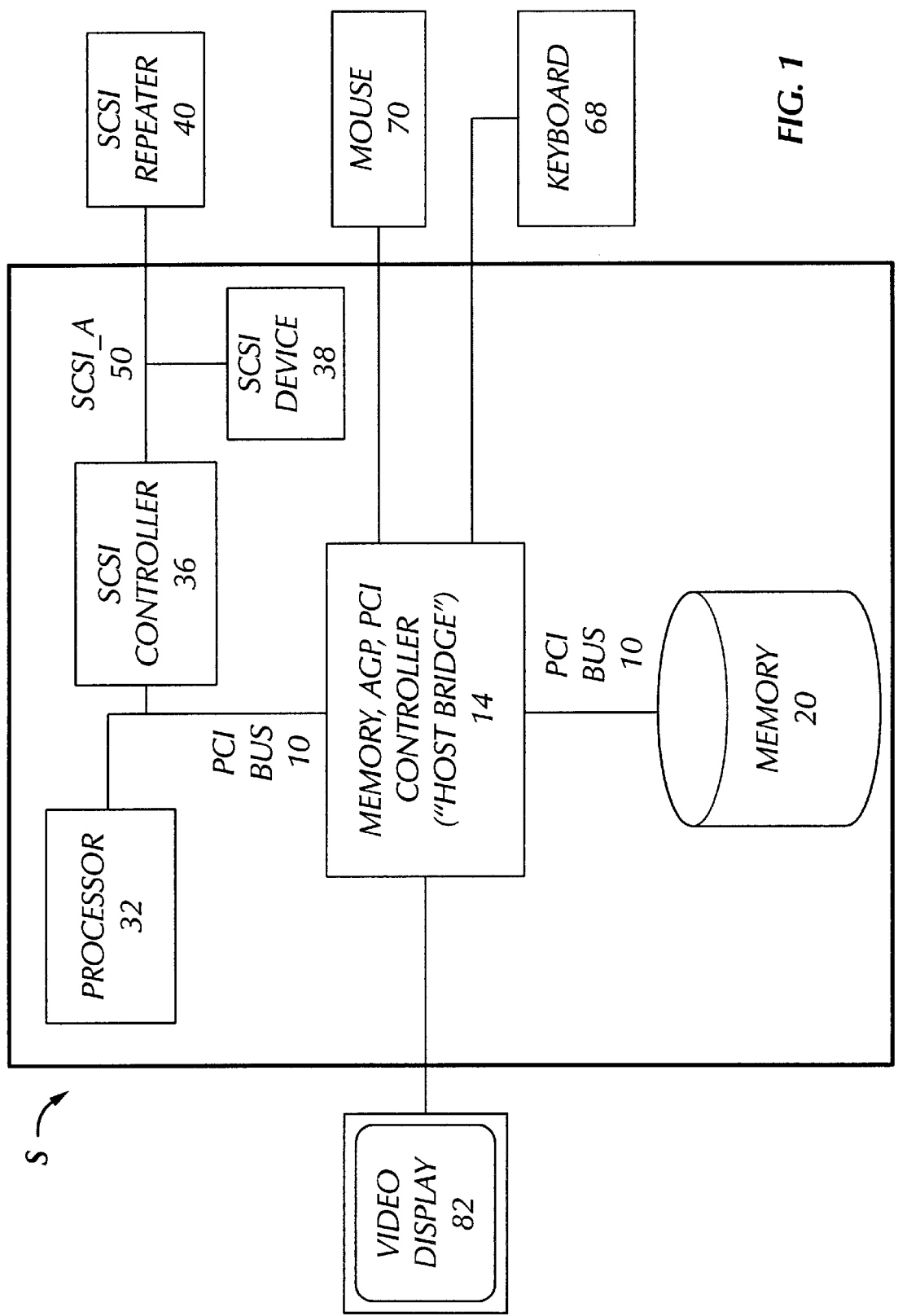
FIG. 1 is a block diagram of a computing system S showing a PCI data bus, peripheral devices, a SCSI bus, a SCSI controller, a SCSI device and a SCSI repeater.

Turning to FIG. 1, illustrated is a typical computing system S in which a bus repeater utilizing the method of the present invention can be installed. The computing system S in the illustrated embodiment is a PCI bus based machine, having a peripheral component interconnect (PCI) bus 10. The PCI bus 10 is controlled by PCI controller circuitry located within a memory/accelerated graphics port (AGP)/PCI controller 14. This controller 14 (the "host bridge") couples the PCI bus 10 to a processor 32 and a memory subsystem 20.

The host bridge 14 in the disclosed embodiment is also known as the PCI AGP Controller (PAC). The processor 32 is preferably a Pentium II. The processor 32 could be replaced with a different processor, other than the Pentium II, without detracting from the spirit of the invention. A video display 82, a mouse 70, and a keyboard 68 are coupled to the host bridge 14, enabling human interaction with the computing system S.

Finally, a SCSI controller 36 is shown connected to the PCI bus 10. Connected to the SCSI controller 36 by means of a SCSI_A bus 50 are a SCSI device 38 and a SCSI repeater 40 (see previously incorporated U.S. patent application entitled "SCSI Repeater Circuit With SCSI Address Translation And Enable"). The SCSI device 38 could be an internal device such as a CD-ROM drive or a tape drive. For the purposes of this example, the SCSI controller 36 and the SCSI repeater 40 employ the methods according to the present invention to adjust setup and hold times, for example by employing an in-band but out of protocol method of communication (see previously incorporated U.S. patent application entitled "Communication Mode Between SCSI Devices").

In a SCSI configuration, a SCSI controller 36 follows the same communication protocol as any other SCSI device and appears to a target as would any other SCSI device. The selection of the SCSI controller 36 as an example of a device that would use the method of the present invention is arbitrary; any SCSI device, initiators or targets, can use the method. In addition, the computing system S illustrates only one platform utilizing the method according to the present invention. The method according to the present invention is also not necessarily restricted to a SCSI bus or SCSI devices; any device that can be attached to a computer bus of any type could also employ the method.

Figure 2:
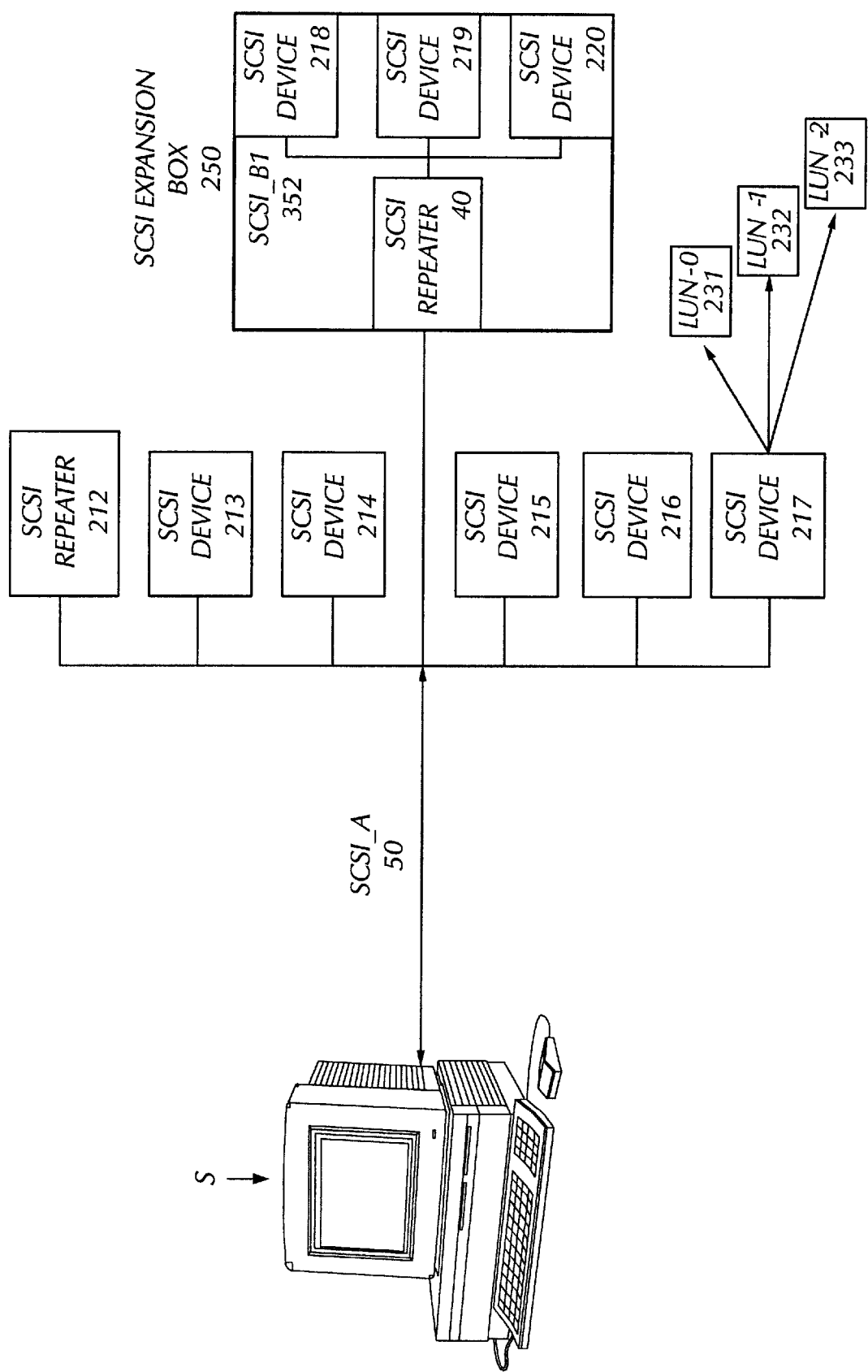
FIG. 2 is a block diagram of a portion of the computing system S showing the SCSI bus, the SCSI repeater and a number of additional SCSI devices.

Turning now to FIG. 2, illustrated is a portion of the computing system S showing, the SCSI_A bus 50, the SCSI repeater 40 incorporated into a SCSI expansion box 250, additional SCSI devices 213–220 and a SCSI repeater 212 which is similar to SCSI repeater 40. Also shown are three logical units (LUNs) 231–233 LUNs 231–233 represent multiple units that together make up the single SCSI device 217. An example of this configuration might be a bank of disk drives where each drive is assigned a LUN ID and all are accessed thorough a single SCSI ID. A SCSI ID uniquely identifies each device on a particular SCSI bus but further identification may be necessary to perform a specific transaction The SCSI repeaters 40 and 212 appear to the SCSI controller 36 as any other SCSI device, utilizing standard SCSI protocols as well as the method of the present invention.

The SCSI expansion box 250 is an example of a SCSI repeater 40 employed external to the computing system S and providing additional storage capability for it. Incorporated into the SCSI expansion box 250 is a SCSI enclosure service (SES) device (not shown). The SES monitors and reports the status of the SCSI expansion box 250. The SES may also provide control capability for the SCSI repeater 40. Preferably, the SES is actually implemented on the same integrated circuit as the SCSI repeater 40.

Figure 3:
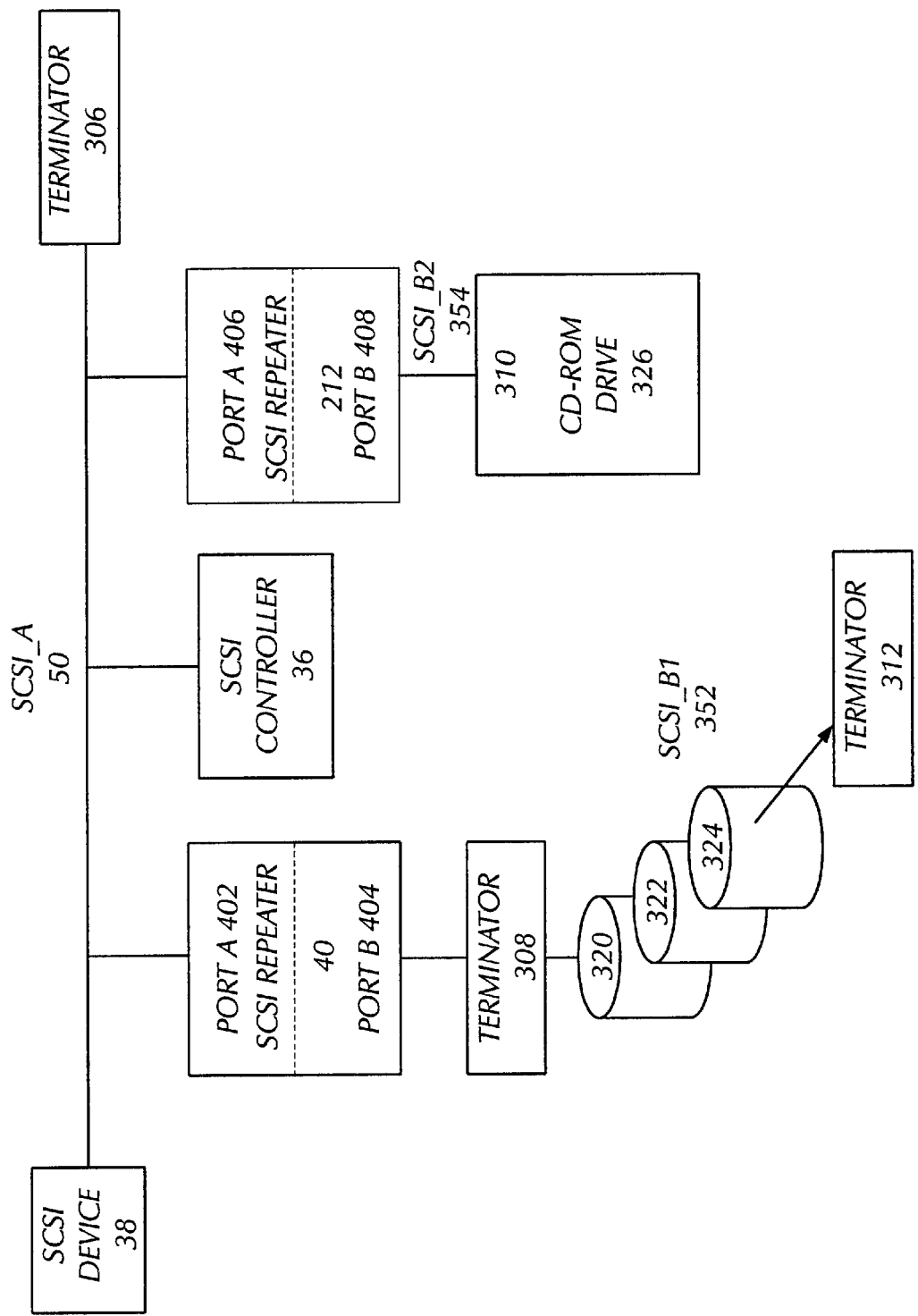
FIG. 3 is a block diagram of a SCSI bus showing two SCSI repeaters on which the method of the present invention might be implemented.

Turning now to FIG. 3, illustrated is SCSI_A 50 of the computing system S. For simplicity, the SCSI controller 36, the SCSI device 38, and the two SCSI repeaters 40 and 213 are the only SCSI devices from FIGS. 1 and 2 that are shown. The SCSI repeaters 40 and 212 are divided into port A 402 and 406 and port B 404 and 408 respectively (see FIG. 4). Port A 402 of repeater 40 and port A 406 of repeater 212 are both connected to SCSI_A 50. Port B 404 of repeater 40 and port B 408 of repeater 212 are connected to a SCSI_B1 352 bus and a SCSI_B2 354 bus respectively.

Typically SCSI buses employ termination to prevent reflections and improve signal quality, and a terminator 306 on SCSI_A 50 is illustrated. SCSI repeaters 40 and 212 are representative of devices on which the method of the present invention is implemented. SCSI repeaters 40 and 212 might serve as targets for the SCSI controller 36, functioning as an initiator. SCSI repeater 40 is connected to a bank of disk drives 320, 322, and 324 by means of SCSI_B1 352. In addition, SCSI_B1 352 is terminated by a pair of terminators 308 and 312. The SCSI repeater 212 is connected to a single SCSI device, a CD-ROM drive 326, by means of the SCSI_B2 354. SCSI_B2 354 is terminated by a terminator 310 that is internal to the CD-ROM drive 326. It is not necessary that SCSI repeaters 40 and 212 be connected to disk drives or a CD-ROM drive; they may be connected to other types of devices such as printers or communication devices.

Figure 4:
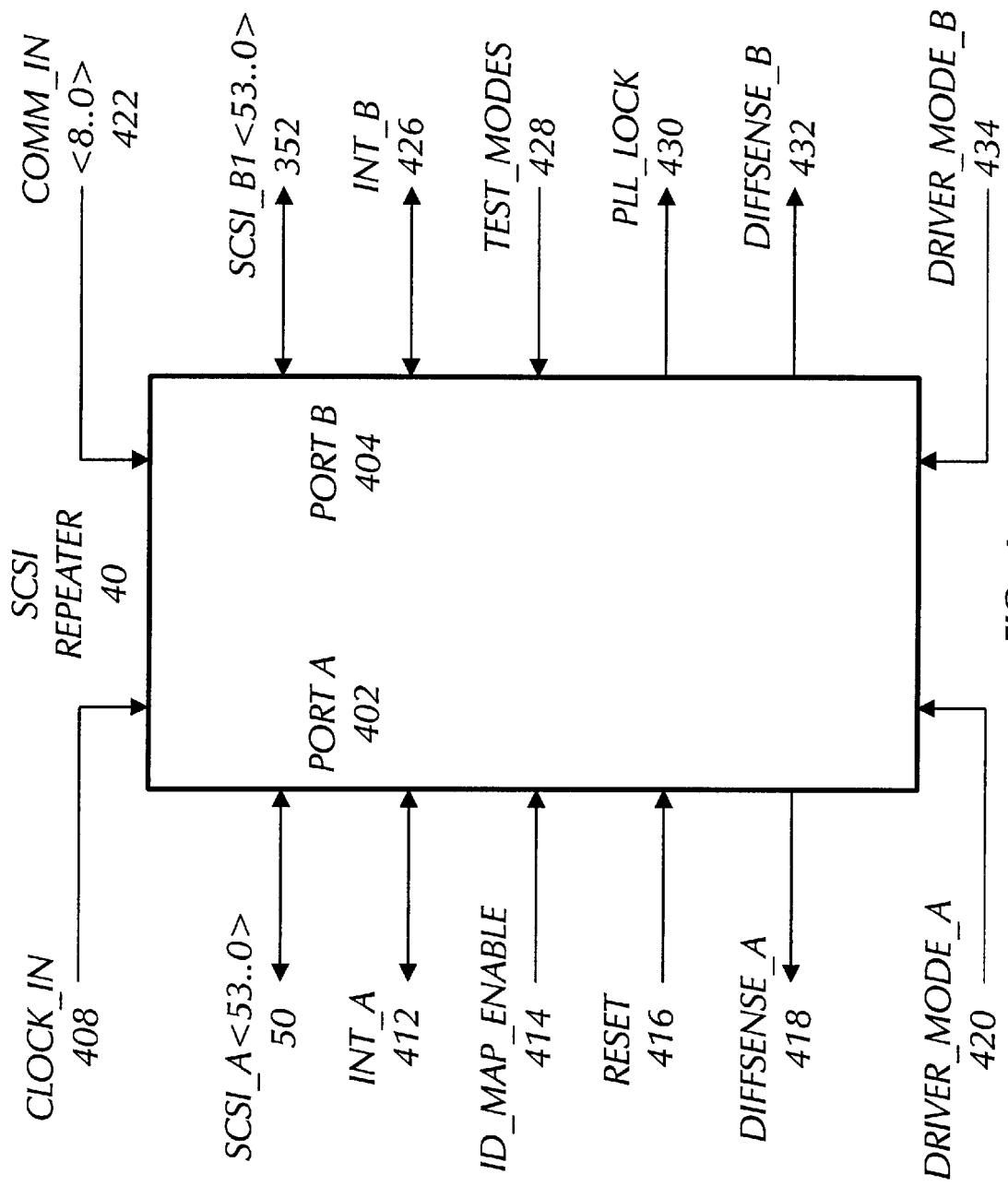
FIG. 4 is a signal diagram illustrating the input and output signals of a SCSI repeater that utilizes the method of the present invention.

Turning now to FIG. 4, illustrated are the input and output signals of a SCSI repeater 40 which can employ the method according to the present invention. Now referring to port A 402 of repeater 40, SCSI_A<53..0> 50 represents fifty-four signals that the repeater 40 can provide to and receive from a wide multi-mode SCSI bus coupled to port A 402. The SCSI controller 36, functioning as an initiator, is coupled to SCSI_A<53..0> 50 and occupies one of sixteen SCSI device addresses, or SCSI ID's. A SCSI ID refers to one bit of the data bus of the SCSI bus, DBA<15..0> (not shown), that is assigned to a SCSI device. Targets, such as disk drives, typically occupy the remaining 15 SCSI IDs.

In normal operation, the SCSI repeater 40 drives all signals asserted on port A 402 to port B 404 and all signals asserted on port B 404 to port A 402. An INT_A signal 412 on port A 402 and a INT_B signal 426 on port B 434, which may be used for side-band signaling, are not relevant to the present invention.

A DRIVER_MODE_A signal 420 on port A 402 controls the SCSI buffer driver modes for SCSI_A 50. Possible mode values include single-ended, low voltage differential, and disabled. The current mode of DRIVER_MODE_A signal 420 is determined by checking a DIFFSENSE_A signal 418.

Now referring to port B 404 of SCSI repeater 40, SCSI_B1<53..0> 352 represents the signals that repeater 40 can provide to and receive from a wide multi-mode SCSI bus coupled to port B 404. Similar to SCSI_A<53..0> 50, SCSI_B1<53..0> 352 includes data signals, represented by DBB<15..0>, that can address up to sixteen SCSI devices. In one embodiment utilizing repeater 40, port B 404 is actually coupled to narrow SCSI buses that can address a limit of eight SCSI devices. A DRIVER_MODE_B signal 434 provides similar functions on SCSI_B1<53..0> 352 as the DRIVER_MODE_A signal 420 provides on SCSI_A<53..0> 50. The current mode of DRIVER_MODE_B signal 434 is determined by checking a DIFFSENSE_B signal 432.

Now referring to signals not specific to either port A 402 or port B 404, a CLOCK_IN 408 signal provided to control all timing internal to the SCSI repeater 40. Typically, the signal is 40 Mhz with a 60/40 duty cycle. In the present example, the SCSI repeater 40 may multiply the CLOCK_IN 408 signal to derive a 240 Mhz clock used internal to the SCSI repeater 40.

A PLL_LOCK signal 430 reports, when interrogated, whether a phase lock loop (PLL) in the SCSI repeater 40 is locked or unlocked. A RESET 416 signal puts the SCSI repeater 40 into a known state. A TEST_MODE signal 428, when asserted, forces the SCSI repeater 40 into a test mode such as a pass-through mode that passes all signals from the port A 402 to port B 404 and all signals from port B 404 to port A 402.

A COMM_IN <7..0> signal 422 represents additional input signals to the SCSI repeater 40. In one embodiment, the COMM_IN <7..0> signals 422 carry status data from another part of the chip, such as the SES.

Address translation, or mapping functions, for SCSI repeater 40 are enabled by an ID_MAP_ENABLE ("MAP") signal 414, of SCSI repeater 40. When MAP 414 is TRUE, SCSI repeater 40 performs address translation during ADDRESS phases of the SCSI protocol.

During DATA phases of the SCSI protocol, the data signals on the SCSI buses coupled to port A 402 and port B 404, represented by DBA<15..0> and DBB<15..0>, are transferred either synchronously or asynchronously by the SCSI repeater 40. Furthermore, during the DATA phases, DBA<15..0> and DBB<15..0> are mapped directly to each other which means DBA<15> is mapped to DBB<15>, DBA<14> is mapped to DBB<14> and so forth.

The method of and apparatus for the present invention employ the SCSI repeater 40 and SCSI_A 50 to implement an adjustment of the configuration parameters of the SCSI protocol. The method enables a SCSI bus such as SCSI_A 50 to optimize its setup time for better performance.

Figure 5:
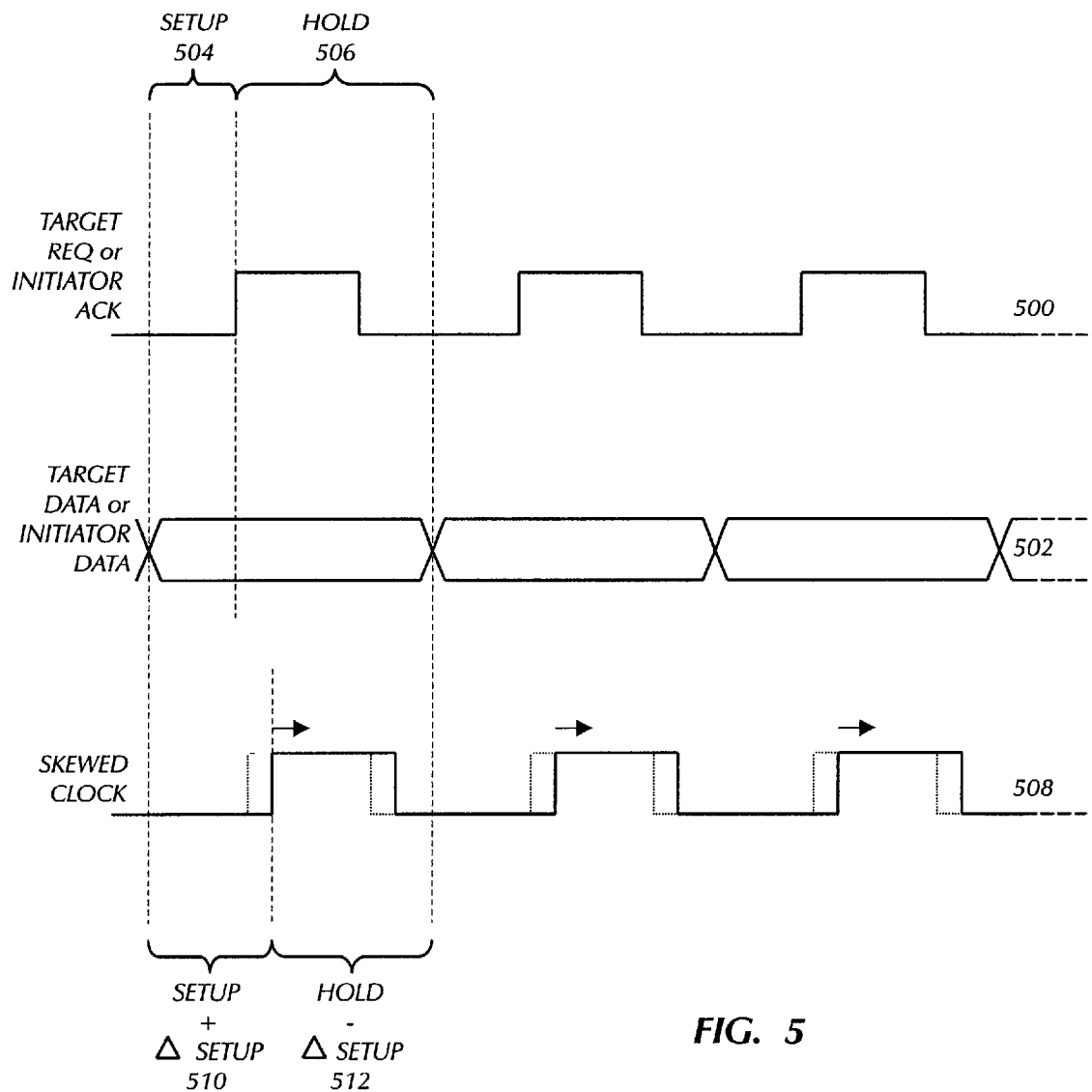
FIG. 5 is a timing diagram showing selected signals in a typical target to initiator data transfer.

Turning now to FIG. 5, illustrated is a timing diagram showing the skewing of the setup and hold times during synchronize transfers according to the invention. Specifically, shown is a synchronize clocks signal 500, which would be the target's REQ# symbol on a DATA_IN phase and would be an initiator's ACK# signal on a DATA_OUT phase (of note, the REQ and ACK signals are shown active high for clarity). Also shown is a data signal 502, which would be provided by the target during DATA_IN phases and by the initiator in DATA_OUT phases. During a standard synchronized transfer, the data has an associated setup time 504 and a hold time 506. The setup time is the amount of time the data provider should assert the data prior to asserting the associated clock, and the hold time is the amount of time the data should be held after the assertion of the associated clock.

Referring to a third timing diagram, shown is an associated skewed clock corresponding to the target REQ or initiator ACK signal 500. In this case, the setup time has been increased, yielding an overall setup time of setup plus delta setup 510, and correspondingly decreasing hold by hold minus delta setup 512. Of note, typically, the setup time is increased because while the repeater 40 according to the invention has multiple REQ/ACK pairs, it only has a signal set of data lines. Therefore, all of the devices must be driving the data lines, while less than all devices are necessarily driving the REQ/ACK pairs. Therefore, the greater loading on the data lines can cause a delay in the associated validity of the data. By increasing setup time, this delay can be compensated for.

It should be noted that in a synchronous data transfer there is no timing correlation between the assertion of the target's REQ# signal and the assertion of the initiator's ACK# signal. Rather, the offset value is employed to set the number of REQ# assertions that can be output by the target before a ACK# assertion must be received by the target. In an asynchronous data transfer, the value of the offset is zero because every data pulse requires an acknowledgement before the next pulse can be sent.

If the setup time 504 is shortened by the method of the present invention, the hold time 506 is lengthened by an equal amount, thereby increasing or decreasing the load on the corresponding signal. A method according to the present invention also modifies in a similar fashion timing of additional REQ# and ACK# signals that are employed in conjunction with the SCSI repeater 40.

While the disclosed embodiment simply shifts the clocks skew, setup and hold times can be individually adjusted. Further, it is possible that setup and hold times for the various REQ and ACK signals could be adjusted based upon not only the REQ and ACK signal, but also on which particular device might be being addressed. This is further discussed below in conjunction with the table of setup and hold times. The block diagrams should reflect the implemented system to satisfy best mode requirements, with the assumption that the commercial embodiment approximates the best mode. In all cases, the system FIG. provides support for a claim to the overall system implementing the invention. This enhances damage recovery. Note that this rule shows why FIG. 1 for a network architecture should not be a computer system—it should be to a network. That is, the overall FIG. 1 should be directed to the broadest system implementing the invention. For certain clients, it is helpful to have a computing system claim directed toward something broader then simply what would be put on a computing system board. Keeping these purposes for a system claim in mind, one will see that providing a highly detailed system like FIG. 1 of a computing system implementing a microcontroller would be inappropriate, for example, in a conceptual application directed towards a network. Again, exercise judgment and discretion in view of the forgoing guidelines in preparing the "FIG. 1" for the application.

Turning now to FIG. 6, illustrated is one embodiment of a control buffer within a SCSI repeater 40 or controller 36. The first column, labeled "Address," contains a typical memory-mapped address location within the repeater 40 or controller 36 where the control buffer can be addressed. The second column, labeled "Size," is the amount of memory in bytes that the control buffer of this embodiment requires. In this case it is sixteen bits. The third column, labeled "Default," shows the value that is loaded into the control buffer at system startup or following a reset signal.

Turning now to FIG. 7, illustrated is a table showing the memory location of FIG. 6 broken up into separate values for the setup and hold times with regard to REQ# 503 and ACK# 505 signals. The first column, labeled "Bit(s)," contains specific bit locations at the address of FIG. 6. For example, the top row refers to bits 12–15 of the register described in FIG. 6. The second column, labeled "Name," lists the signal and whether the setup time for a REQ# or an ACK# signal is affected. For example, the first row contains information relating to the setup and hold times relative to the REQ# signal on the SCSI B1 side of the SCSI repeater 40. The third column, labeled "Type," indicates whether the value of that row can be read (R), written (W), or both (R/W). In this embodiment, all setup and hold times can be both read and written. The fourth row, label "Default," contains a startup default value of the amount of time in clock ticks that the specific period is to be adjusted (see FIG. 8). In this example, the value "6," or 0110 in binary, indicates that the adjustable time periods are not changed at all. The fifth column, labeled "Description," contains explanations of what values and signals the specific row refers to.

Turning now to FIG. 8, illustrated is a table containing values that present the length of time the setup time 504 and hold time 506 are to be shifted. The first column, labeled "Selection," corresponds to the binary equivalent of the values in the Default column of FIG. 7. For example, the 6's in the Default column of FIG. 7 are equal to the binary number 0110 shown in the seventh row of FIG. 8. The second column, labeled "Delta Data Setup," indicates the number of clock ticks of the repeater 40 that the corresponding value in the Selection column represents. For example, if the 4–7 bits (row 3, column 1, FIG. 7) of memory location 900000008 (row 1, column 1, FIG. 6) are set to the binary value 0000 (row 1, column 1, FIG. 8), then the data setup 504 and hold 506 times relative to the REQ# signal 503 on the SCSI B1 bus 352 should have 3 clock ticks, or 12.5 nanoseconds, subtracted (row 1, column 2, FIG. 8). The 12.5 nanoseconds decrease corresponds to the interval 510 in FIG. 5. The third column of FIG. 8, labeled "Delay In ns," represents the time in nanoseconds that the corresponding number of clock ticks in column 2 represents. In this example, the value −3.0 in the first row, second column represents −12.5 nanoseconds for a clock running at 240 Mhz.

Figure 9:
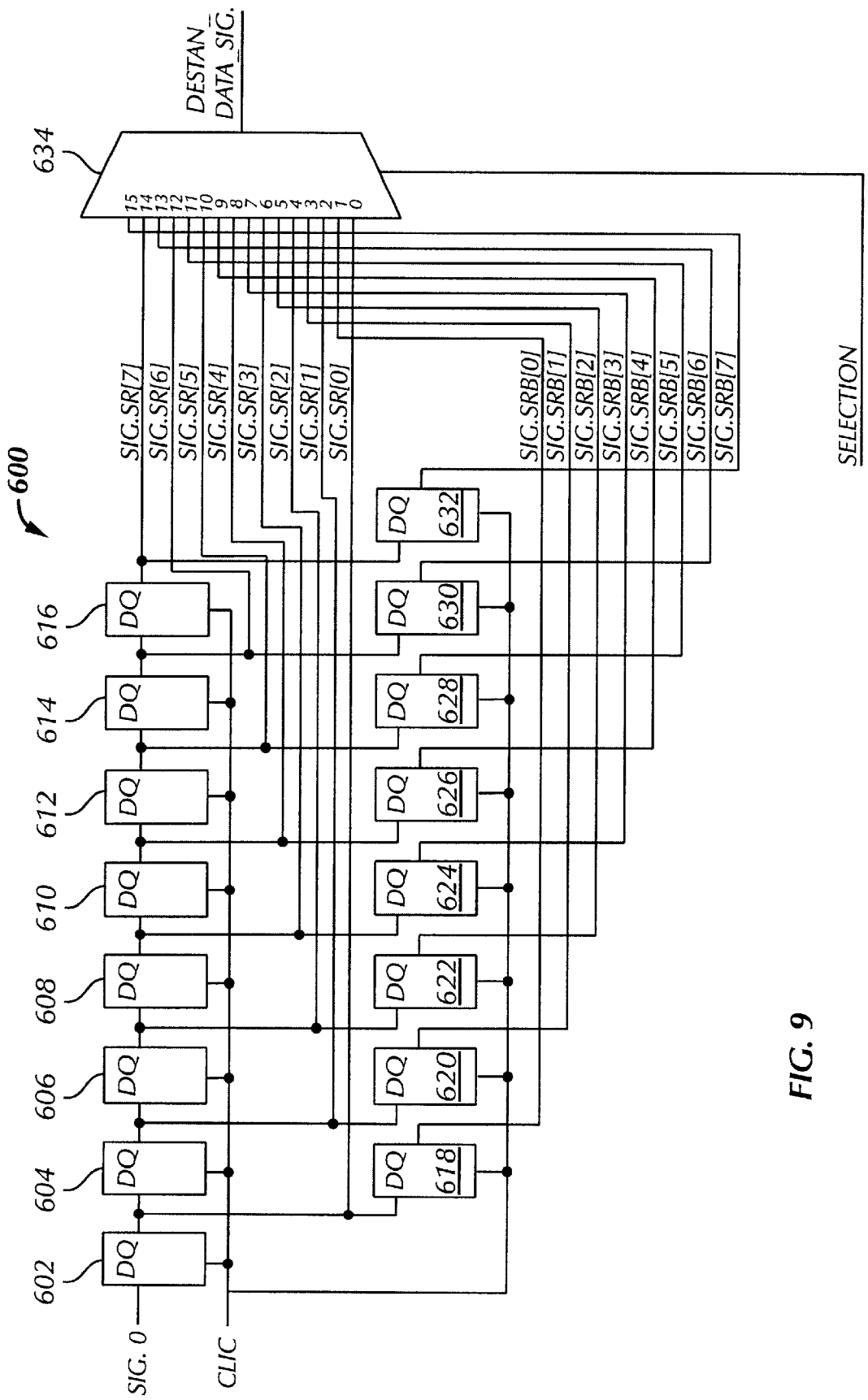
FIG. 9 is a schematic diagram illustrating the circuitry used to delay the SCSI ACK# or REQ# signals according to the invention.

Turning to FIG. 9, illustrated is a schematic diagram of circuitry 600 which provide the Delta Data Setup of FIG. 8 Specifically, shown is a series of flip flops 602–632 which form a shift register, shifting a SCSI clock signal SIG_O through the series of registers 602–616 at a frequency specified by a clock signal CLK. The SCSI clock signal SIG_O is the appropriate REQ# or ACK# signal before the programmable skew is added. The clock signal CLK in the disclosed embodiment is a 240 Mhz signal, which is the internal clock of the SCSI repeater 40. The stages of the shift register formed by the register 602–632 are fed into a multiplexer 634, which selects an appropriate stage signal SIG_SR[7..0] or SIG_SRB[7..0] based on a selection signal SELECTION, which corresponds to the selection value of FIG. 8. In turn, a DELTA_DATA_SIG signal is provided, which is the skew adjusted REQ# or ACK# signal, such as the request signal REQ#, for example, of FIG. 5.

In an output block of the repeater 40, the REQ# or ACK# signal is not asserted for an appropriate set up time, less the default skew value as specified by Delta Data Setup. As noted above, a default value of 6 specifies 0 nanoseconds of skew before the assertion of the REQ# or ACK# signal. This corresponds, using a 240 Mhz clock signal CLK, to 12.5 nanoseconds. Therefore, the output drivers of the repeater 40 are constructed such that when Delta Data Setup has only one clock of delay from SIG_O, the corresponding REQ# or ACK# signal is asserted 12.5 nanoseconds early relative to a SCSI defined setup time.

Therefore, when SELECTION equals 0, DELTA_DATA_SIG will track SIG_O only delayed by one clock, and the setup time will be reduced by 12.5 nanoseconds. When SELECTION equals 6, corresponding to the selection value of FIG. 8 equaling 6, DELTA_DATA_SIG is delayed by 12.5 nanoseconds, being provided as the SIG_SR [3] signal from the flip flop 606. This causes a delay in the assertion of REQ# or ACK#, as the case may be, of 12.5 nanoseconds, which, as discussed above, results in a standard setup time for those signals. If, for example, SELECTION equals 14, then the output of the flip flop 616 will be provided as DELTA_DATA_SIG, causing a delay of 16.6 nanoseconds.

Therefore, by providing the appropriate delay from data output to assertion of the assertion of REQ# or ACK# signals on the SCSI bus, the setup time can be adjusted on a REQ# or ACK# basis.

Further, it will be appreciated that it would even be possible to adjust setup times not only on a REQ# or ACK# basis, but further on a device-by-device basis. In that case, there would be a separate register for the values of FIG. 7 for each possible attached SCSI device.

It will be appreciated that the adjustable setup and hold time according to the invention could be implemented in a SCSI initiator, a SCSI target, SCSI repeater, or a variety of other SCSI devices.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of improving communication on a SCSI bus, the method comprising the steps of:
   providing a SCSI data signal;
   providing a SCSI clock signal having a setup time relative to the SCSI data signal; and
   adjusting the setup time on a device-by-device basis.

2. The method of claim 1, wherein the SCSI clock signal is a REQ# signal on the SCSI bus.

3. The method of claim 1, wherein the SCSI clock signal is an ACK# signal on the SCSI bus.

4. The method of claim 1, wherein the setup time is adjusted by increasing the setup time.

5. The method of claim 1, wherein the setup time is adjusted by decreasing the setup time.

6. The method of claim 1, wherein the setup time is adjusted responsive to programmed register values for a plurality of SCSI devices.

7. A method of improving communication on a SCSI bus, the method comprising the steps of:
   providing a SCSI data signal;
   providing a SCSI clock signal having a setup time relative to the SCSI data signal; and
   adjusting the setup time, wherein the setup time is adjusted by +18.7 nanoseconds to −12.5 nanoseconds.

8. A SCSI repeater circuit, the repeater circuit comprising:
   logic for providing a SCSI data signal on a SCSI bus,
   logic for providing a SCSI clock signal having a setup time relative to the SCSI data signal; and
   logic for adjusting the setup time on a device-by-device basis.

9. The SCSI repeater circuit of claim 8, wherein the SCSI clock signal is a REQ# signal on the SCSI bus.

10. The SCSI repeater circuit of claim 8, wherein the SCSI clock signal is an ACK# signal on the SCSI bus.

11. The SCSI repeater circuit of claim 8, wherein the setup time is adjusted by increasing the setup time.

12. The SCSI repeater circuit of claim 8, wherein the setup time is adjusted by decreasing the setup time.

13. The SCSI repeater circuit of claim 8, wherein the setup time is adjusted responsive to programmed register values for a plurality of SCSI devices.

14. A SCSI repeater circuit, the repeater circuit comprising:
   logic for providing a SCSI data signal on a SCSI bus;
   logic for providing a SCSI clock signal having a setup time relative to the SCSI data signal; and
   logic for adjusting the setup time, wherein the setup time is adjusted by +18.7 nanoseconds to −12.5 nanoseconds.

15. A SCSI controller, the controller comprising:
   logic for providing a SCSI data signal on a SCSI bus;
   logic for providing a SCSI clock signal having a setup time relative to the SCSI data signal; and
   logic for adjusting the setup time on a device-by-device basis.

16. The SCSI controller of claim 15, wherein the SCSI clock signal is a REQ# signal on the SCSI bus.

17. The SCSI controller of claim 15, wherein the SCSI clock signal is an ACK# signal on the SCSI bus.

18. The SCSI controller of claim 15, wherein the setup time is adjusted by increasing the setup time.

19. The SCSI controller of claim 15, wherein the setup time is adjusted by decreasing the setup time.

20. The SCSI controller of claim 15, wherein the setup time is adjusted responsive to programmed register values for a plurality of SCSI devices.

21. A SCSI controller, the controller comprising:
   logic for providing a SCSI data signal on a SCSI bus;
   logic for providing a SCSI clock signal having a setup time relative to the SCSI data signal; and
   logic for adjusting the setup time, wherein the setup time is adjusted by +18.7 ns to −12.5 ns.

* * * * *